(12) United States Patent
Wang et al.

(10) Patent No.: US 10,503,616 B2
(45) Date of Patent: *Dec. 10, 2019

(54) PERIODIC DATA REPLICATION

(71) Applicant: CA, Inc., New York, NY (US)

(72) Inventors: Xiaopin Wang, Beijing (CN); Haiyang Zhang, Beijing (CN); Shaorong Li, Beijing (CN)

(73) Assignee: CA, Inc., New York, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 15/439,513

(22) Filed: Feb. 22, 2017

(65) Prior Publication Data

US 2017/0161161 A1    Jun. 8, 2017

Related U.S. Application Data

(63) Continuation of application No. 12/955,299, filed on Nov. 29, 2010, now Pat. No. 9,588,858.

(51) Int. Cl.
| | |
|---|---|
| *G06F 11/20* | (2006.01) |
| *G06F 16/27* | (2019.01) |
| *G06F 11/16* | (2006.01) |
| *G06F 11/14* | (2006.01) |
| *H04L 29/08* | (2006.01) |

(52) U.S. Cl.
CPC ...... *G06F 11/2038* (2013.01); *G06F 11/1464* (2013.01); *G06F 11/1662* (2013.01); *G06F 11/2097* (2013.01); *G06F 16/27* (2019.01); *H04L 67/1095* (2013.01); *G06F 2201/84* (2013.01)

(58) Field of Classification Search
CPC .. G06F 11/2038; G06F 16/27; G06F 11/1464; G06F 11/1662; G06F 11/2097; G06F 2201/84; H04L 67/1095
See application file for complete search history.

(56) References Cited

U.S. PATENT DOCUMENTS

| | | | |
|---|---|---|---|
| 6,158,019 A | 12/2000 | Squibb | |
| 7,558,926 B1 * | 7/2009 | Oliveira | ............... G06F 11/1471 711/161 |
| 8,805,847 B2 | 8/2014 | Wang et al. | |
| 2005/0210081 A1 | 9/2005 | Fleck et al. | |
| 2006/0218203 A1 | 9/2006 | Yamato et al. | |
| 2007/0083570 A1 | 4/2007 | Fineberg | |

(Continued)

*Primary Examiner* — David T. Brooks
(74) *Attorney, Agent, or Firm* — Pillsbury Winthrop Shaw Pittman LLP

(57) ABSTRACT

Systems and methods for replicating data from a production server to a backup server include recording at least one operation on one or more data items stored in a volume of a production server. The operation may be recorded as at least one journal event in a memory. A determination may then be made regarding whether a system malfunction incident has occurred in the production server and if so, a first set of journal events may be transferred from the memory to an auxiliary storage at a first time instant. At a second time instant, a second set of journal events recorded in the memory between the first and second time instants may be transferred to the auxiliary storage. At one journal event stored in the auxiliary storage unit may then be sent for replication to a backup server.

25 Claims, 2 Drawing Sheets

(56) References Cited

U.S. PATENT DOCUMENTS

| | | | |
|---|---|---|---|
| 2007/0277012 A1* | 11/2007 | Hara | G06F 11/1471 711/162 |
| 2009/0132615 A1* | 5/2009 | Shinozaki | G06F 11/1451 |
| 2010/0005259 A1* | 1/2010 | Prahlad | G06F 11/1435 711/162 |
| 2010/0005260 A1* | 1/2010 | Inoue | G06F 11/2058 711/162 |
| 2010/0023805 A1* | 1/2010 | Colaiacomo | G06F 11/1438 714/15 |
| 2011/0282842 A1 | 11/2011 | Popovski et al. | |

* cited by examiner

PERIODIC DATA REPLICATION

This application is a continuation of U.S. patent application Ser. No. 12/955,299, filed on Nov. 29, 2010, now allowed. The content of the foregoing application is incorporated herein in its entirety by reference.

FIELD

The invention generally relates to data backup and recovery, and more particularly to periodic data backup and replication.

BACKGROUND

Data replication for backup and recovery purposes is generally achieved by creating a shadow copy of a storage volume. Such replication may be done, for example, using Volume Shadow Copy Service (VSS) utility of the Windows™ operating system. A VSS command may be issued to take a volume snapshot periodically such as, for example, every fifteen minutes, to ensure that all application data and data in a cache memory in the file system are flushed to disk.

Between volume snapshots, data operations performed on the files and/or directories of a volume may be recorded (as events) in a memory for determining the total changes to the volume data at a later time. One concern with managing such recorded operations is preserving those operations during a system malfunction incident such as, for example, memory overflow. In other words, if the operation recordation is halted or if the recorded operations are lost due to a system malfunction, it may be difficult to accurately determine and replicate the data changes or updates that affected the volume.

One way to determine the data changes between two snapshots may be to compare the snapshots on a file-by-file or directory-by-directory basis, and send the differences to a backup system or server. However, this process may be very slow, thereby negatively impacting the performance of the replication system.

Thus, it is desirable to preserve recorded operations during a system malfunction in a replication process without slowing down, or otherwise negatively impacting the replication process.

SUMMARY

In some implementations, the invention provides systems and methods for data replication from a master server (e.g., a production server) to a replica server (e.g., a backup server). Systems and methods described herein provide mechanisms to address system malfunction incidents in the master server by preserving recorded events and consolidating the events before sending out to the replica server.

A system for data replication may include a master application, which may reside in or otherwise be operatively associated with the master server. The master application may be or include a computer application (or plurality of applications capable of communicating with one another) having one or more modules thereon, which when executed, perform data replication from a master server to a replica server.

In some implementations, the one or more modules may include instructions causing one or more processors to record at least one operation on one or more data items stored in a volume of a production server. In some implementations, the recorded operation may be recorded as at least one journal event in a memory. A determination may be made if a system malfunction incident has occurred in the production server and if so, a first set of journal events may be transferred from the memory to an auxiliary storage at a first time instant. At a second time instant, a second set of journal events recorded in the memory between the first and second time instants may be transferred to the auxiliary storage. Further, at least one journal event stored in the auxiliary storage unit may then be sent for replication to a backup server. The one or more processors may be further configured to perform other features and/or functions.

In some implementations, the plurality of operations may be recorded as journal events without recording data content associated with the plurality of operations. In some implementations, the plurality of operations may include one or more of truncate, rename, remove, create, write, change security, or change property, and/or other operations.

In some implementations, a system malfunction incident may include a storage capacity of the memory (i.e., that stores the first set of consolidated journal events) reaching a threshold, failure of a connection between the master and replica servers, failure to capture the snapshot of the volume of the master server, and/or other system malfunction incidents.

In some implementations, the invention provides a method for data replication from a master server to a replica server. In some implementations, the invention may include a tangible computer readable storage media having computer or processor-executable instructions thereon, that when executed by one or more processing devices, may configure the one or more processing devices to perform one or more of the features and functions described herein.

These and other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION

Figure 1:
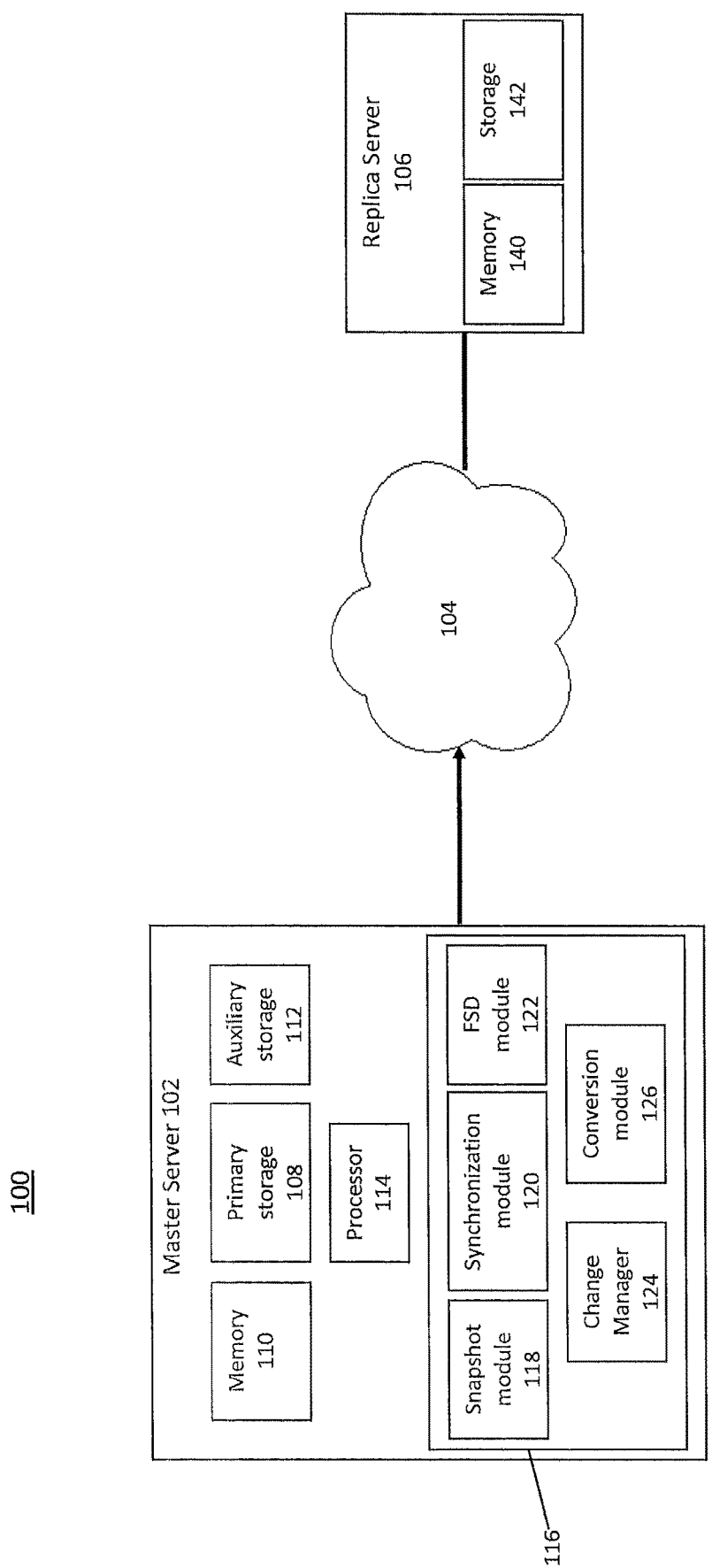
FIG. 1 illustrates an example of an environment that includes a system for performing data replication, according to various implementations of the invention.

In some implementations, the invention provides systems and methods for data replication from a master server to a replica server. FIG. 1 illustrates an example of an environment 100 in which a system for performing data replication resides. As depicted in FIG. 1, environment 100 includes a system for replicating data from a master server (e.g., a production server) to a replica server (e.g., a backup server). The system in the environment 100 may include a master server 102 communicatively coupled, via a network 104, to a replica server 106. Although only one master server 102 and replica server 106 is shown in FIG. 1, this is for illustrative purposes only. In some implementations, there may be a plurality of master servers 102 and/or a plurality of replica servers 106 connected via one or more networks 104 or otherwise connected to one another. Master server 102 may store data to be backed-up or replicated (e.g., periodically or on-demand) to ensure that critical applications and data are available during outages. Outages may be planned (e.g., system maintenance), or unplanned (e.g., human error, viruses and other malware and natural disasters). Data considered for replication (i.e., replicated or protected data) may include or may be associated with data items operated on or updated by one or more components or functions of master server 102. Such data items may include one or more data files or one or more directories or other data items stored in one or more volumes of a storage of master server 102, and may be sent to replica server 106 for replication. Replica server 106 may be acting as a backup server to the master server 102. After an initial backup and replication of data items to be protected, further operations on the data items may be recorded as events without recording the data associated with the operations (i.e., changes to the data items). The events may be consolidated and sent to replica server 106, where these events may be used to update the already backed-up data items at replica server 106. The recorded events may be consolidated at master server 102, for example, using techniques described in U.S. Pat. No. 8,805,847, entitled "Journal Event Consolidation," which is incorporated by reference herein in its entirety. This mechanism of using recorded events to update replicated data may reduce data redundancy in the replication process, thereby increasing replication and recovery speed, and decreasing CPU usage and network overhead.

Network 104 may include the Internet and/or other networks. It will be appreciated that this is not intended to be limiting, and that the scope of this disclosure includes implementations in which the master server 102 and the replica servers 106 are operatively linked via some other communication methodology. In some implementations, environment 100 may include one or more elements other than master server 102 and replica server 106 (not shown) .These other elements may include one or more servers, desktops, laptops, workstations, wireless devices (e.g., smartphones, personal digital assistants, etc.), routers, switches, and/or other network or other devices.

In some implementations, master server 102 may include a primary storage 108, a memory 110, and an auxiliary storage 112. Although storages 108, 112 and memory 110 (collectively referred to as the "storage units") are depicted as separate components in master server 102, they may be combined in one or two storage units. One or more of storage units 108, 110 and 112 may comprise electronic storage media that electronically stores information. Such electronic storage media may be provided integrally (i.e., substantially non-removable) to master server 102 and/or as removable storage that is removably connectable to master server 102 via, for example, a port (e.g., a USB port, a firewire port, etc.) or a drive (e.g., a disk drive, etc.). Storage units 108, 110 and 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Primary storage 108 may store the protected data (e.g., files and/or directories to be backed-up), volume shadow copies of the protected data, software algorithms, and/or other information that enables master server 102 to function as described herein. Memory 110 may store the events associated with the operations on the protected data. Auxiliary storage 112 may store data (e.g., events information) transferred from memory 110 before being sent to replica server 106.

In some implementations, master server 102 may include a processor 114 may be configured to provide information processing capabilities in master server 102. As such, processor 114 may include one or more of a digital processor, an analog processor, a digital circuit designed to process information, an analog circuit designed to process information, a state machine, and/or other mechanisms for electronically processing information. Although processor 114 is shown in FIG. 1 as a single entity, this is for illustrative purposes only. In some implementations, processor 114 may include a plurality of processing units. These processing units may be physically located within the same device or computing platform, or processor 114 may represent processing functionality of a plurality of devices operating in coordination.

In some implementations, replica server 106 may act as a backup server to master server 102 and may include various components (not depicted in FIG. 1) such as user interfaces, processors, local storage systems, and so forth. Components similar to one or more of the components described above with respect to master server 102 (e.g., storage units 108, 110, 112 and processor 114) may be part of replica server 106. Such components may be used for the same or different functions as described above for master server 102.

In some implementations, master server 102 may run or operate a master application 116 for data change recordation and replication process. Master application 116 may be or include a computer application (or plurality of applications capable of communicating with one another) having one or more modules including a snapshot module 118, a synchronization module 120, a file system driver (FSD) module 122, a change manager 124, and an evaluation module 126. In some implementations, the modules of master application 116 may include computer executable instructions embodied on computer readable storage media, e.g., primary storage 108. These computer executable instructions may be used to configure processor 114 of master server 102 for performing one or more features and functions, including those disclosed herein and/or other features and functions. In some implementations, master application 116 modules may be implemented across multiple applications and/or devices within environment 100 to perform the data replication features and functions described herein.

It should be appreciated that although modules 118, 120, 122, 124 and 126 are illustrated in FIG. 1 as being co-located with a single processing unit, in implementations in which processor 114 includes multiple processing units, one or more of modules 118, 120, 122, 124 and/or 126 may be located remotely from the other modules. The description of the functionality provided by the different modules, i.e., modules 118, 120, 122, 124 and/or 126 described below is for illustrative purposes, and is not intended to be limiting, as any of modules 118, 120, 122, 124 and/or 126 may provide more or less functionality than is described. For example, one or more of modules 118, 120, 122, 124 and/or 126 may be eliminated, and some or all of its functionality may be provided by other ones of modules 118, 120, 122, 124 and/or 126. As another example, processor 114 may be configured to execute one or more additional modules that may perform some or all of the functionality attributed below to one of modules 118, 120, 122, 124 and/or 126.

In some implementations, one or more components (e.g., components 110, 112, and 114) and/or modules (e.g., 116, 118, 120, 122, 124 and 126) of master server 102 may reside on one or more computing elements (e.g., servers or other machines) separate from but otherwise connected to master server 102.

In some implementations, snapshot module 118 may be configured to create a copy of at least a part of the data stored in master server 102, e.g., a volume of primary storage 108. In some implementations, snapshot module 118 may copy data items including, for example, files, directories, and other data in a cache memory of master server 102. Data items copied by snapshot module 118 may be or may be related to applications that are currently running on master server 102 or any other element of the system, and/or are mission-critical. Snapshot module 118 may be configured to copy data items in a consistent state, i.e., create a shadow copy of the data items such that there may be no data change or update while the data items are being copied by snapshot module 118. Snapshot module 118 may store the copied data in a section of primary storage 108 or other section of master server 102 assigned for backup storage. Snapshot module 118 may create a shadow copy of data items in master server 102 periodically (e.g., every 15 minutes), or at command of a user or an administrator. In one example, snapshot module 118 may utilize or otherwise incorporate the Volume Snapshot Service (VSS) utility of the Windows™ operating system to create data snapshots.

In some implementations, synchronization module 120 may be configured to perform an initial synchronization between master server 102 and replica server 106. This initial synchronization may include comparing the snapshot data copied by snapshot module 118 (and stored at master server 102) and data residing at the replica server 106 to identify any differences, and sending the differences to replica server 106. The synchronized data at replica server 106 may indicate an initial consistent state at replica server 106 and may be used as the starting point for future replications of the data changes or updates at master server 102.

In some implementations, synchronization module 120 may perform initial synchronization in different ways. For example, in one implementation, synchronization module 120 compares and sends all file content read from the snapshots created by snapshot module 118. Regardless of any file and/or directory updates that may have occurred under one or more protected directories during the synchronization, the data for comparison between master server 102 and replica server 106 are read from snapshots already created by snapshot module 118, which will not be affected by these changes. After comparison, data representing or related to any differences between master server 102 and replica server 106 may also be read from snapshots by snapshot module 118. Accordingly, replica server 106 is synchronized with master server 102 with a consistent state base corresponding to the "beginning" of the synchronization.

In some implementations, synchronization module 120 may be configured to utilize data stored in original relevant volumes of master server 102, instead of data from the snapshots generated by snapshot module 118, for initial synchronization. A first snapshot may be generated by snapshot module 118, which may be used by synchronization module 120, for example, to first build a directory structure including path and names of files and/or directories copied in the first snapshot taken. A point in time of the first snapshot may be recorded by FSD module 122. For comparison between master server 102 and replica server 106, synchronization module 120 may first enumerate all file and/or directory full paths from the built directory structure, and then read the file content from the original volumes that reflect the most current data changes in those files and/or directories. If a difference is identified in the data read from the original volumes and what replica server 106 stores, data corresponding to that difference are sent to replica server 106 to complete synchronization. In this instance, after synchronization, replica server 106 usually receives an inconsistent base due to file/directory changes that may have occurred in the original volumes during the synchronization process but that may not have been captured in the directory structure built from the snapshots. Accordingly, to bring replica server 106 to a consistent state, a second snapshot may be created by snapshot module 118 immediately after the initial synchronization. A point in time of the second snapshot may be recorded by FSD module 122. The second snapshot may then be later utilized in the next replication cycle to backup the data changes that occurred at master server 102 between the points in time of the first and second snapshots, or during synchronization. Accordingly, in this instance, replica server 106 is synchronized to a consistent base corresponding to the "end" of the replication cycle.

In some implementations, file system driver (FSD) module 122 may capture and record any operations, changes or updates related to the data of the relevant and protected files and/or directories of master server 102. FSD module 122 may capture the data operations and/or changes in real time before or during synchronization performed by synchronization module 120. FSD module 122 may record those operations and/or changes as journal events in a raw journal stored in the memory 110. In some instances, journal events may include information related to, for example, time and type of operation performed and other operation-related information. Examples of such journal events are listed in Table 1.

TABLE 1

| Type | Description |
| --- | --- |
| WRITE | Write data to a file |
| TRUNCATE | Truncate data from a file |
| CREATE | Create a file or directory |
| OPEN | Open a file or directory |
| CLOSE | Close a file or directory |
| CLOSE_REMOVE | Delete on close for a file or directory |
| REMOVE | Delete a file or directory |
| RENAME | Rename a file or directory |
| CHANGE_ATTR | Change the attributes for a file or directory |
| CHANGE_SECURITY | Change the security (e.g., ACL) for a file or directory |

In some implementations, FSD module 122 may be configured to operate in "skip written data" mode in which FSD module 122 records the events without recording the actual data associated with those events. This mode may facilitate generating and recording events with a smaller event size. For example, for events such as WRITE, CHANGE_ATTR and CHANGE_SECURITY, FSD module 122 may be configured to only record the filename, timestamp and the range of changed data, but not the actual data, in the affected file. As will be described later, data related to such events may be recorded as and sent for replication (to the replica server 106) from periodic snapshots taken by snapshot module 118 in master server 102. In general, FSD module 122 may record at least operation type and time of the operation in each event type.

In some instances, the events recorded by FSD module 122 may be redundant or become redundant after a period of time during the operation of master server 102. To reduce or remove redundancy among the already-recorded events or events being recorded in the real time by FSD module 122, change manager 124 may consolidate the events in memory 110. The consolidated events thus obtained from change manager 124 may be transferred to memory 110 or auxiliary storage 112 before sending out to replica server 106. Change manager 124 may periodically (e.g., every 3 seconds) receive the journal events from the raw journal in memory 110 for consolidation. For certain event sets, like a set of events including multiple WRITE events, each including its respective data change range, change manager 124 may consolidate the data change range from all the WRITE events and generate a consolidated data change range to be eventually sent to the replica server 106. For example, change manager 124 may receive WRITE (3, 7) and WRITE (4, 10) events for a particular file indicating that new data was written, in one operation, in the file in a data change range from byte location 3 to byte location 7, and in another operation, in a data change range from byte location 4 to byte location 10, respectively. Change manager 124 may be configured to consolidate these two WRITE events to a WRITE (3, 10) event indicating that the file was updated with new data in a collective data change range from byte location 3 to byte location 10. The change manager 124 may perform such consolidation on-the-fly by consolidating the events already present at change manager 124 with the events being received from the raw journal. In some instances, the format of the events recorded by FSD module 122 (and stored in the raw journal) may not be compatible with the format supported by change manager 124. Accordingly, change manager 124 may be associated with a journal translator (not shown in FIG. 1) which first receives journal events from the raw journal, and translates and send the events in format compatible with and/or understood by change manager 124 for consolidation.

Evaluation module 126 may be configured to determine if a system malfunction incident has occurred in master server 102. The system malfunction incident may adversely affect the operation of one or more components and modules of master server 102, thereby adversely affecting information flow within master server 102. For example, a malfunction incident may relate to the usage of memory 110 (e.g., consolidated journal events reaching a threshold capacity). Under such incident, memory 110 may not be able to accept more events captured by FSD module 122, thereby negatively affecting the process of recording every operation on the protected data. Another example of a malfunction incident detected by evaluation module 126 may relate to a failure of a connection between master server 102 and replica server 106. Responsive to such incident, evaluation module 126 may determine if the connection is re-established. The re-establishment of the connection may indicate that the events at master server 102 may be ready to be sent to replica server 106. Another example of a malfunction incident may include a failure of snapshot module 118 to capture a snapshot at a predetermined time of replication. To address any or all the incidents described above or other incidents, evaluation module 126 may transfer the events from memory 110 to auxiliary storage 112 from where the events can then be sent out to replica server 106. In some implementations, this transfer of events to auxiliary storage 112 is done to free-up space in memory 110, thereby allowing more journal events to be recorded in the raw journal therein.

Figure 2:
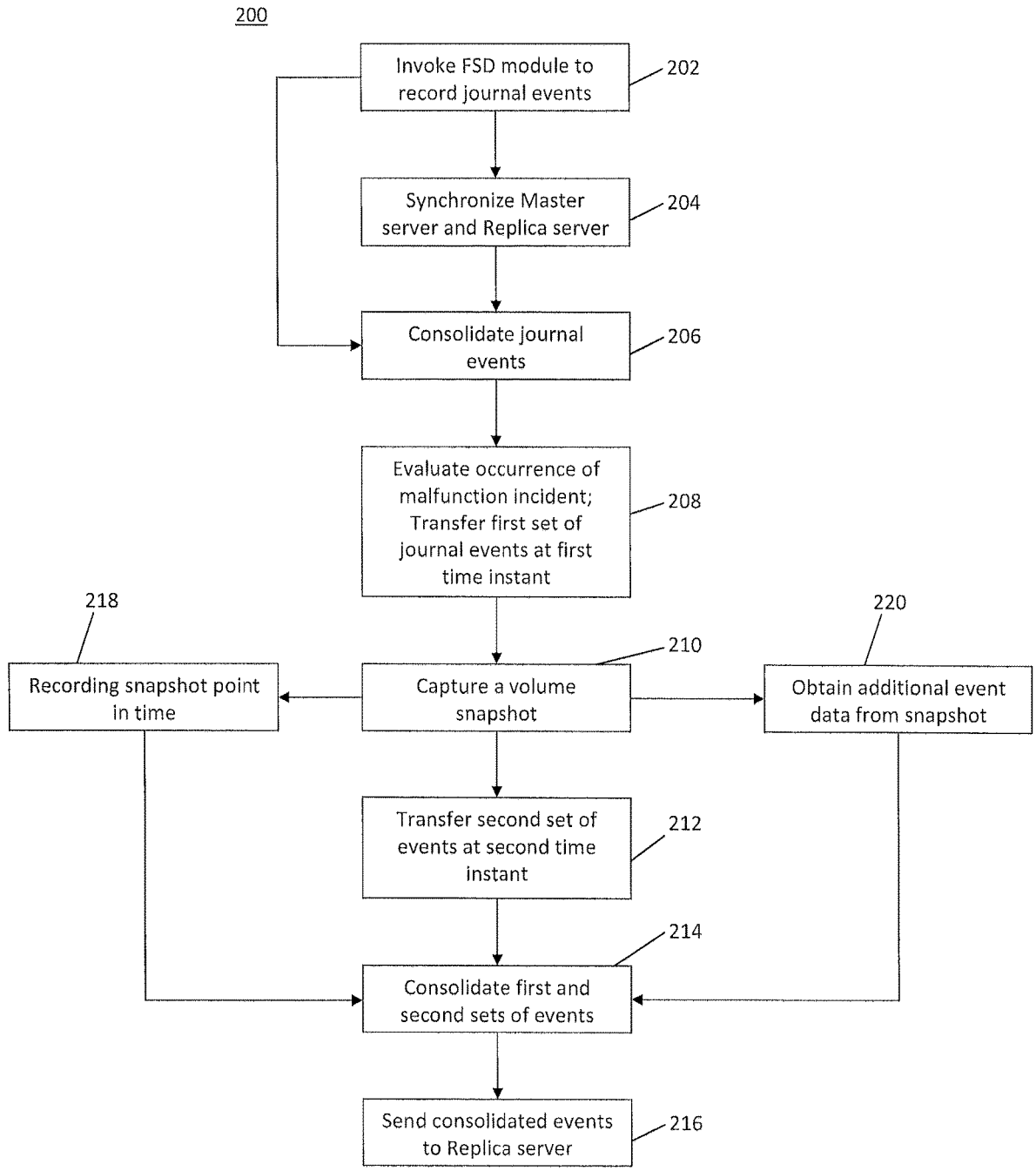
FIG. 2 illustrates an example of a method for data replication, according to various implementations of the invention.

In some implementations, the invention provides a method for data replication from a production server (e.g., master server 102) to a backup server (e.g., replica server 106). FIG. 2 illustrates a process 200, which is an example of a process for data replication from master server 102 to replica server 106. In some implementations, process 200 may be performed by one or more processors configured by computer executable instructions for performing a plurality of operations (e.g., the operations of process 200).

Process 200 includes an operation 202, wherein FSD module 122 may be invoked to record operations, in a real time manner, performed on data items associated with protected files and/or directories stored in a volume of master server 102. As discussed above, the operations may be recorded as journal events in a raw journal residing in memory 110. For some operations such as, for example, WRITE and CHANGE_SECURITY, FSD module 122 need not record the actual data related to the operation but may only record a type of the operation, time of operation and other relevant information.

After invoking FSD module 122, in an operation 204, synchronization module 120 is invoked to perform an initial synchronization between master server 102 and replica server 106. As discussed above, in this initial synchronization, the differences between the protected data stored at master server 102 and the replicated protected data at replica server 106 are determined and data related to the determined differences are sent to replica server 106 to bring replica server 106 to a consistent synchronized state.

In an operation 206, also after invoking FSD module 122, change manager 124 is invoked to consolidate the journal events recorded in memory 110 on an event-by-event basis (i.e., as each new event is recorded), consolidate a set of events already recorded in the memory, or a combination thereof. The consolidated events may be stored back in memory 110 until the time of replication, whereupon they are transferred to auxiliary storage 112 for transmission to replica server 106. In some instances, the consolidated events may be immediately transferred to auxiliary storage 112.

In an operation 208, evaluation module 126 may determine if a system malfunction incident has occurred in master server 102. Upon determination that a malfunction occurred, at a first time instant, evaluation module 126 may transfer all or part of the consolidated events from memory 110 to auxiliary storage 112, from where the consolidated events may then be sent to replica server 106 at a predetermined time of replication. The malfunction incident may include incidents which, in general, may halt a current replication process between master server 102 and replica server 106. For example, the malfunction incident may include memory 110 being utilized beyond a threshold value, a loss of connection between master server 102 and replica server 106, replica server 106 being temporarily disabled for maintenance or upgrade, a failure to capture a snapshot by snapshot module 118, or other malfunction incidents. The events resident in auxiliary storage 112 may be stored there for one or more replication time periods until the malfunction incident is resolved.

In an operation 210, snapshot module 118 may be invoked to capture a snapshot of a volume of storage 108 containing protected files and/or directories at a time instant set as per the predetermined replication period (which may be selected by a user through a GUI). In some implementations, the capturing of a snapshot may invoke, in an operation 212, transfer of consolidated journal events at a second time instant from memory 110 to auxiliary storage 112. The consolidated events transferred in operation 212 may include all or part of consolidated events recorded in memory 110 by FSD module 122 between the first time instant (in operation 208) and the second time instant.

In an operation 214, change manager 124 may be invoked again, this time to consolidate both sets of journal events in auxiliary storage 112, i.e., event sets transferred to storage 112 at the first and second time instants. This operation may reduce or remove redundancy from the journal events sent to replica server 106. The final consolidated event set (or at least a part thereof) may be then sent out, in an operation 216, from auxiliary storage 112 to replica server 106 via network 104, or otherwise communicated from master server 102 to replica server 106. Upon receiving the consolidated events, replica server 106 may apply them to its backed up protected files and/or directories to replicate the most recent data content and state of those files and/or directories at master server 102.

Referring back to operation 210, the capturing of a snapshot may be followed by an operation 218 including recording a point in time at which the snapshot is captured. This snapshot point in time is notified to FSD module 122 for recordation as an event. FSD module 122 may insert this event at the end of the set of consolidated events residing in auxiliary storage 112 obtained after the consolidation of operation 214, but before sending out the consolidated events in operation 216. In some implementations, the snapshot point in time acts as a consistency bookmark to allow replica server 106 to rewind back (i.e., undo event changes) to the consistent state which resulted from the snapshot being taken at that point in time. As such, the consistency bookmark may be used as a data recovery mechanism.

Some events, such as TRUNCATE, RENAME, REMOVE, CREATE, sent out in the operation 216 may not be associated with any data except filename, operation type and timestamp. For such events, it may be sufficient to send the events as obtained by the consolidation in operation 214 and send them to replica server 106. However, for other events, such as WRITE and CHANGE_SECURITY, additional data including, for example, data content that was added in file associated with the respective event, may also be send along with those events in the consolidated event sequence. For example, for a WRITE event, such additional data may be associated with the data change range indicated in the WRITE event and may be obtained, in an operation 220, from the snapshot generated by operation 210. A content map that maps the data part of journal events to one or more snapshots may be used to obtain the additional data. A content map entry may represent one journal event, and may record the event header part (e.g., timestamp, etc.) and reference the event data part to one or more snapshots.

In an embodiment, there is provided a method for data replication from a production server to a backup server, comprising: recording at least one operation performed on one or more data items stored in a volume of a production server, wherein the at least one operation is recorded as at least one journal event in a memory; determining whether a system malfunction incident has occurred in the production server; transferring the at least one journal event from the memory to an auxiliary storage unit at a first time instant, when it is determined that the system malfunction incident has occurred; transferring, at a second time instant, one or more additional journal events recorded in the memory between the first and second time instants to the auxiliary storage unit; and sending at least one journal event stored in the auxiliary storage unit for replication to a backup server. In an embodiment, the recording further comprises consolidating the at least one journal event with one or more previously recorded journal events as each of the at least one journal event is recorded in the memory. In an embodiment, the method further comprises: consolidating the at least one journal event and the one or more additional journal events in the auxiliary storage as an event sequence; and sending at least part of the event sequence for replication to a backup server. In an embodiment, the at least one operation is recorded as the at least one journal event without recording data content associated with the at least one operation. In an embodiment, the at least one operation includes one or more of truncate, rename, remove, or create operations. In an embodiment, the system malfunction incident includes a storage capacity of the memory reaching a threshold. In an embodiment, the system malfunction incident includes failure of a connection between the production and backup servers. In an embodiment, the method further comprises evaluating if the connection between the production and backup servers is re-established before sending the at least one journal event stored in the auxiliary storage unit to the backup server. In an embodiment, the method further comprises: capturing a snapshot of the volume of the production server; and sending a point in time of the capturing of the snapshot to the backup server. In an embodiment, the system malfunction incident includes failure to capture the snapshot of the volume of the production server. In an embodiment, the capturing-a-snapshot step invokes the transferring step at the second time instant. In an embodiment, the capturing-a-snapshot step is performed periodically. In an embodiment, the at least one operation includes one or more of write, change security, or change property operations. In an embodiment, the method further comprises: retrieving data associated with the at least one journal event stored in the auxiliary storage unit from the captured snapshot; and sending the retrieved data along with the at least one journal event stored in the auxiliary storage unit to the backup server.

In an embodiment, there is provided a system for data replication from a production server to a backup server, comprising: one or more processors configured to: record at least one operation on one or more data items stored in a volume of a production server, wherein the at least one operation is recorded as at least one journal event in a memory; determine whether a system malfunction incident has occurred in the production server; transfer the at least one journal event from the memory to an auxiliary storage unit at a first time instant, when it is determined that the system malfunction incident has occurred; transfer, at a second time instant, one ore more additional journal events recorded in the memory between the first and second time instants to the auxiliary storage unit; and send at least one journal event stored in the auxiliary storage unit for replication to a backup server.

In an embodiment, the one or processors are further configured to consolidate the at least one journal event with one or more previously recorded journal events as each of the at least one journal event is recorded in the memory. In an embodiment, the one or more processors are further configured to: consolidate the at least one journal event and the one or more additional journal events in the auxiliary storage as an event sequence; and send at least part of the event sequence for replication to a backup server. In an embodiment, the at least one operation is recorded as the at least one journal event without recording data content associated with the at least one operation. In an embodiment, the at least one operation includes one or more of truncate, rename, remove, or create operations. In an embodiment, the system malfunction incident includes a storage capacity of the memory reaching a threshold. In an embodiment, the system malfunction incident includes failure of a connection between the production and backup servers. In an embodiment, the one or more processors are further configured to evaluate if the connection between the production and backup servers is re-established before sending the at least part one journal event stored in the auxiliary storage unit to the backup server. In an embodiment, the one or more processors are further configured to: capture a snapshot of the volume of the production server; and send a point in time of the capturing of the snapshot to the backup server. In an embodiment, the system malfunction incident includes failure to capture the snapshot of the volume of the production server. In an embodiment, the one or more processors are configured to transfer the second set of journal events at the second time instant immediately after capturing a snapshot of the volume of the production server. In an embodiment, the one or more processors are configured to capture a snapshot of the volume of the production server periodically. In an embodiment, the at least one operation includes one or more of write, change security, or change property operations. In an embodiment, the one or more processors are further configured to: retrieve data associated with at least one journal event stored in the auxiliary storage unit from the captured snapshot; and send the retrieved data along with the at least one journal event stored in the auxiliary storage unit to the backup server.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A method, comprising:
   determining whether a system malfunction incident has occurred in a production server that has recorded an operation performed on a data item stored in a volume of the production server as a journal event in a memory, wherein:
   the system malfunction incident comprises:
      a storage capacity of the memory reaching a threshold;
      failure of a connection between the production and backup servers; and/or
      failure to capture the snapshot of the volume of the production server; and
   the system malfunction prevents or halts replication from the operational production server to a backup server, prevents or halts recording of the operation performed on the data item, and/or prevents or halts capturing in the operational production server of a snapshot of data for replication;
   transferring the journal event from the memory to an auxiliary storage unit at a first time instant, responsive to a determination that the system malfunction incident has occurred;
   transferring, at a second time instant, an additional journal event recorded in the memory between the first and second time instants to the auxiliary storage unit; and
   sending the journal event stored in the auxiliary storage unit for replication to a backup server.

2. The method of claim 1, further comprising consolidating the journal event with a previously recorded journal event as the journal event is recorded in the memory.

3. The method of claim 1, further comprising:
   consolidating the journal event and the additional journal event in the auxiliary storage as an event sequence; and
   sending at least part of the event sequence for replication to a backup server.

4. The method of claim 1, wherein the operation is recorded as the journal event without recording data content associated with the operation.

5. The method of claim 1, further comprising:
   capturing a snapshot of the volume of the production server; and
   sending a point in time of the capturing of the snapshot to the backup server.

6. The method of claim 5, wherein the capturing the snapshot invokes the transferring step at the second time instant.

7. The method of claim 5, further comprising:
   retrieving data associated with the journal event stored in the auxiliary storage unit from the captured snapshot; and.
   sending the retrieved data along with the journal event stored in the auxiliary storage unit to the backup server.

8. The method of claim 1, comprising:
   steps for data replication from a primary server to replica server.

9. The method of claim 1, the auxiliary storage unit comprises means for acting as a backup server.

10. The method of claim 1, comprising steps for copying data items in a consistent state.

11. The method of claim 1, comprising steps for performing an initial synchronization.

12. A system comprising:
   a hardware processor system configured to:
      determine whether a system malfunction incident has occurred in a production server that has recorded an operation performed on a data item stored in a volume of the production server as a journal event in a memory, wherein:
      the system malfunction incident comprises:
         a storage capacity of the memory reaching a threshold;
         failure of a connection between the production and backup servers; and/or
         failure to capture the snapshot of the volume of the production server; and
      the system malfunction prevents or halts replication from the operational production server to a backup server, prevents or halts recording of the operation performed on the data item, and/or prevents or halts capturing in the operational production server of a snapshot of data for replication;
      transfer the journal event from the memory to an auxiliary storage unit at a first time instant, responsive to a determination that the system malfunction incident has occurred;
      transfer, at a second time instant, an additional journal event recorded in the memory between the first and second time instants to the auxiliary storage unit; and
      send the journal event stored in the auxiliary storage unit for replication to a backup server.

13. The system of claim 12, wherein the processor system is further configured to consolidate the journal event with a previously recorded journal event as the journal event is recorded in the memory.

14. The system of claim 12, wherein the processor system is further configured to:
consolidate the journal event and the additional journal event in the auxiliary storage as an event sequence; and
send at least part of the event sequence for replication to a backup server.

15. The system of claim 14, wherein the operation is recorded as the journal event without recording data content associated with the operation.

16. The system of claim 12, wherein the processor system is further configured to:
capture a snapshot of the volume of the production server; and
send a point in time of the capturing of the snapshot to the backup server.

17. The system of claim 16, wherein the processor system is further configured to transfer the additional journal event at the second time instant after capturing a snapshot of the volume of the production server.

18. The system of claim 16, wherein the processor system is further configured to:
retrieve data associated with the journal event stored in the auxiliary storage unit from the captured snapshot; and
send the retrieved data along with the journal event stored in the auxiliary storage unit to the backup server.

19. The system of claim 12, wherein:
the hardware processor system is configured to execute steps for data replication from a primary server to replica server.

20. The system of claim 12, the auxiliary storage unit comprises means for acting as a backup server.

21. The system of claim 12, wherein the hardware processor system is configured to execute steps for copying data items in a consistent state.

22. The system of claim 12, wherein the hardware processor system is configured to execute steps for performing an initial synchronization.

23. A computer program product comprising:
a non-transitory computer readable storage medium storing information, the stored information comprising:
instructions configured to cause a processor to:
determine whether a system malfunction incident has occurred in a production server that has recorded an operation performed on a data item stored in a volume of the production server as a journal event in a memory, wherein:
the system malfunction incident comprises:
a storage capacity of the memory reaching a threshold;
failure of a connection between the production and backup servers; and/or
failure to capture the snapshot of the volume of the production server; and
the system malfunction prevents or halts replication from the operational production server to a backup server, prevents or halts recording of the operation performed on the data item, and/or prevents or halts capturing in the operational production server of a snapshot of data for replication;
transfer the journal event from the memory to an auxiliary storage unit at a first time instant, responsive to a determination that the system malfunction incident has occurred;
transfer, at a second time instant, an additional journal event recorded in the memory between the first and second time instants to the auxiliary storage unit; and
send the journal event stored in the auxiliary storage unit for replication to a backup server.

24. The computer program product of claim 23, further comprising instructions configured to cause the processor to:
consolidate the journal event and the additional journal event in the auxiliary storage as an event sequence; and
send at least part of the event sequence for replication to a backup server.

25. The computer program product of, claim 23, further comprising instructions configured to cause the processors to:
retrieve data associated with the journal event stored in the auxiliary storage unit from the captured snapshot; and
send the retrieved data along with the journal event stored in the auxiliary storage unit to the backup server.

* * * * *